(12) United States Patent
Dressler et al.

(10) Patent No.: US 9,630,136 B2
(45) Date of Patent: Apr. 25, 2017

(54) AIR FILTER

(71) Applicant: Mahle International GmbH, Stuttgart (DE)

(72) Inventors: Bernd Dressler, Stuttgart (DE); Frank Rohde, Kernen (DE); Hendrik Von Merkatz, Remseck (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/021,270

(22) PCT Filed: Sep. 9, 2014

(86) PCT No.: PCT/EP2014/069151
§ 371 (c)(1),
(2) Date: Mar. 10, 2016

(87) PCT Pub. No.: WO2015/036386
PCT Pub. Date: Mar. 19, 2015

(65) Prior Publication Data
US 2016/0220940 A1    Aug. 4, 2016

(30) Foreign Application Priority Data
Sep. 11, 2013   (DE) .......................... 10 2013 218 219

(51) Int. Cl.
*B01D 46/52*    (2006.01)
*B01D 46/00*    (2006.01)
*B01D 46/10*    (2006.01)

(52) U.S. Cl.
CPC ....... *B01D 46/523* (2013.01); *B01D 46/0002* (2013.01); *B01D 46/0005* (2013.01); *B01D 46/10* (2013.01); *B01D 2201/127* (2013.01)

(58) Field of Classification Search
CPC ............ B01D 46/0002; B01D 46/0005; B01D 46/521; B01D 46/523; B01D 2265/06; B01D 2201/127
See application file for complete search history.

(56) References Cited

U.S. PATENT DOCUMENTS 2,135,863 A * 11/1938 Walker ............... B01D 46/0002
                                                    55/499
4,177,050 A * 12/1979 Culbert ................. B01D 46/10
                                                    55/499

(Continued)

FOREIGN PATENT DOCUMENTS

DE            3529579 A1    2/1987
DE            3936858 A1    5/1991

(Continued)

OTHER PUBLICATIONS

Machine translation of DE 3936858, published May 8, 1991.*

(Continued)

*Primary Examiner* — Robert Clemente
(74) *Attorney, Agent, or Firm* — Fishman Stewart PLLC

(57) ABSTRACT

An air filter may include a bellows made of an air-permeable filter medium, which is folded in a longitudinal direction to form a plurality of folds, for filtering air, and a supporting frame for supporting the bellows. The supporting frame may be a substantially closed comb-like ring having a plurality of supporting teeth. At least two supporting teeth adjacent in the longitudinal direction may fix at least two folds of the bellows also adjacent in the longitudinal direction to a predefined distance from each other. The comb-like ring may include two fold blades and two outer bands connecting the fold blades. The fold blades may be inserted in a transverse direction running transversely to the longitudinal direction into respective end folds of the bellows. The two (Continued)

outer bands may have the supporting teeth, including high supporting teeth and low supporting teeth.

20 Claims, 5 Drawing Sheets

(56) References Cited

U.S. PATENT DOCUMENTS

| | | | | |
|---|---|---|---|---|
| 5,273,563 | A | * | 12/1993 | Pasch ................ B01D 46/0005 55/493 |
| 5,273,564 | A | * | 12/1993 | Hill ................... B01D 46/0005 55/493 |
| 5,531,892 | A | | 7/1996 | Duffy |
| 5,667,545 | A | | 9/1997 | Honda et al. |
| 5,711,775 | A | * | 1/1998 | Field ........................ A47L 9/20 15/352 |
| 5,792,229 | A | * | 8/1998 | Sassa ................ B01D 46/0001 55/497 |
| 6,074,450 | A | * | 6/2000 | Raber ................... B01D 46/10 55/497 |
| 2003/0070406 | A1 | * | 4/2003 | Duffy ................. B01D 29/031 55/497 |
| 2003/0159415 | A1 | * | 8/2003 | Parker ............... B01D 46/0005 55/481 |
| 2004/0035096 | A1 | | 2/2004 | Ham |
| 2005/0039427 | A1 | * | 2/2005 | Karlsson ................ B01D 46/10 55/497 |
| 2010/0236204 | A1 | * | 9/2010 | Bouhanna .......... B01D 46/0005 55/494 |
| 2014/0230388 | A1 | * | 8/2014 | Hio ........................ B01D 46/10 55/499 |
| 2015/0013287 | A1 | * | 1/2015 | Yamaguchi .......... B01D 46/521 55/491 |

FOREIGN PATENT DOCUMENTS

| | | |
|---|---|---|
| DE | 19816238 A1 | 10/1999 |
| DE | 10111318 A1 | 10/2001 |
| JP | H11-511380 A | 10/1999 |
| KR | 20-0295354 | 11/2002 |

OTHER PUBLICATIONS

English abstract provided for DE-10111318 A1.
English abstract for DE-19816238A1.
English abstract for DE-3936858A1.
English abstract for DE-3529579A1.
English abstract for KR-20-0295354.
English translation of Korean Office Action for KR1020167007685, dated Aug. 10, 2016.

* cited by examiner

AIR FILTER

CROSS-REFERENCE TO RELATED APPLICATIONS

This application claims priority to German Patent Application No. 10 2013 218 219.8, filed Sep. 11, 2013, and International Patent Application No. PCT/EP2014/069151, filed Sep. 9, 2014, both of which are hereby incorporated by reference in their entirety.

TECHNICAL FIELD

The invention relates to an air filter, in particular a passenger compartment filter

BACKGROUND

Any filtering separator which is able to be remove aerosols or other undesired suspended matter such as pathogens, pollen, dusts or gases from the air is designated as an air filter. Typically, fibres or grains come into use as filter medium or collector of a generic air filter.

DE 101 11 318 A 1 discloses a filter device for equipping a ventilation and/or heating and/or air-conditioning system, in particular for motor vehicles, which comprises a frame which surrounds at least partially a flexible and deformable filter medium: The frame consists of a flexible and deformable thermoplastic elastomer and is fastened by forming on the filter medium; it comprises two side walls of small thickness, the inner surfaces of which are provided with elevations which surround the longitudinal edges of the filter medium.

DE 198 16 238 A 1 proposes a reinforcement strip for a plate-shaped filter element with filter web material folded in a zigzag shape, which with an ability of the filter element to be curved provides for a reciprocal fixing in position of the folds. A reinforcement strip having the following features is intended to serve this purpose: The reinforcement strip is constructed in the form of a comb with a continuous longitudinal crosspiece and with teeth proceeding therefrom; the teeth of the comb are suitable for the substantially form-fitting receiving of the folds of the filter web material; pairs of teeth spaced apart from one another, consisting of adjacent teeth, are constructed as spring clips for a force-fitting clamping respectively of a fold of a filter web material; the longitudinal crosspiece of the reinforcement strip is flexible elastically in the longitudinal plane spanned by the teeth, whilst it is constructed so as to be considerably more rigid against lateral bending.

SUMMARY

The invention is based on the problem of providing a particularly light air filter.

This problem is solved by an air filter having the features of the claims.

The invention is based, accordingly, on the fundamental idea of embodying the circumferential supporting frame of a bellows, functioning as a filter body, in the form of a novel multifunctional component, which is to be designated below as a "comb-like ring" owing to its supporting teeth, projecting in the manner of prongs. In their shape and arrangement along the circumferential comb-like ring, these supporting teeth are configured here in such a way that at least one supporting tooth, in particular supporting teeth adjacent in longitudinal direction, are able to fix two folds, adjacent in the longitudinal direction of the bellows, at a predefined distance.

In order to mechanically reinforce the end-side folds of the bellows and in particular to protect them from a possible bending under stress, said comb-like ring can comprise two fold blades aligned transversely to the folding direction, which for this purpose are inserted into the opposite end folds. In such an embodiment, it additionally presents itself to arrange the described supporting teeth along two outer bands connecting the fold blades. As the mentioned fold blades already give the comb-like ring and therefore the entire air filter a certain flexural rigidity in the longitudinal direction of the bellows, in this case a flexurally slack embodiment of the outer bands proves to be sufficient in order to ensure the secure hold and the maintaining of the predefined fold distance in the most varied of flow speeds of the air stream which is to be filtered. A certain flexibility of the outer bands running laterally to the bellows may even prove to be advantageous in so far as the elastic prestressing force thereof promotes an optimum lying of the comb-like ring against the walls of a mounting housing provided for receiving the air filter, and therefore prevents any leakages.

A productive compromise between the reduction in weight which is aimed for according to the invention on the one hand, and the necessary fixing of the bellows on the other hand, can be achieved here by the outer bands of the comb-like ring having an alternating arrangement of high and low supporting teeth. At equidistant nodal points along the outer bands, for example at every third, fourth or fifth fold of the bellows, in this case a joining point can be provided, in order to permanently secure the connection of bellows and comb-like ring.

In order to use for this purpose the molecular or nuclear forces of the contact surfaces on both sides, with regard to said joining points in particular a firmly bonded connection between folds and supporting teeth is to be considered, which is given the desired stability for example by a welding technique according to DIN 8593-6:2003-09. In addition, the bonding standardized in DIN 8593-8:2003-09 comes into consideration as a comparatively low-heat joining technique, which prevents warping, cooling stresses or structural changes on the part of the bellows or of the comb-like ring.

In the latter variant, in particular the use of a group of adhesives known as hot melt is recommendable, which are also designated in materials science in an application-specific manner as thermal fusion adhesives, hot melt adhesives, hot adhesives or hot glues. The low viscosity of a generic hot melt above its melting point permits in this case an uncomplicated wetting, in terms of practical production, of the comb-like sing functioning as a substrate, whilst the subsequent cooling of the hot melt initiates a permanent cohesion.

To receive any compressive forces acting in longitudinal direction of the bellows onto the air filter, its supplementing by one or more supporting struts presents itself, which stabilize the opposite fold blades with respect to one another and therefore additionally strengthen the structural integrity of the arrangement. If such a supporting strut is provided with supporting teeth, as were already explained with respect to the outer bands, then at the same time it permits an improved fixing of the folds.

Finally, the position of the folds can be secured by means of a belt band surrounding the bellows, wherein for this purpose a belt width falling short of the height of the bellows proves to be sufficient. Remaining lateral openings of the bellows, finally, can be closed by means of a circumferential sealing band, which according to function is to be produced from a sealing medium which is impermeable to air. An alternative use of these openings as outlets for condensed water in most cases proves to be unnecessary in this respect.

The described configuration permits the comb-like ring, serving as supporting frame, to be embodied with a wall thickness of less than 1.0 mm, at least, however, less than 1.5 mm, without unduly endangering the dimensional stability of the air filter. Such a composition can be realized for example by way of injection moulding, by means of which according to the prior art workpieces in the weight range of a few tenths of a gram are already considered as being able to be produced.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
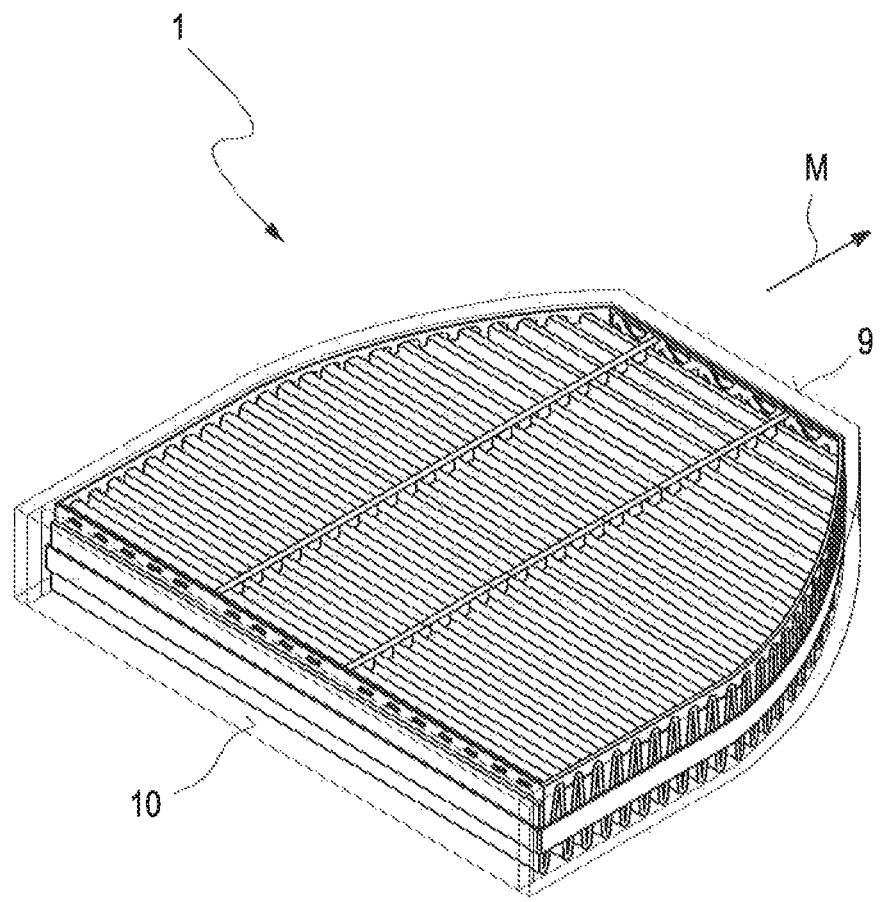
FIG. 1 the perspective view of an air filter according to an embodiment of the invention, FIG. 2 an exploded illustration, corresponding to FIG. 1, of the air filter according to the invention, FIG. 3 the enlarged detail illustration of the air filter in a first edge region, FIG. 4 the enlarged detail illustration of the air filter in a second edge region, and FIG. 5 a detail illustration, corresponding to FIG. 4, of the air filter secured by means of a belt band.

The perspective illustration of FIG. 1 illustrates an air filter 1 according to the invention, in its final state ready for installation, which is adapted to the corresponding basic form of a mounting housing, not shown in FIG. 1. In this respect, the shape of the air filter 1, narrowing in the provided mounting direction M, and its contact surface 9 on the end face, facing away from the observer, permits the insertion of the air filter 1 through a closure cover of the housing, until the contact surface 9 lies in a form-fitting manner against the end face of the housing.

In this final position, the air filter 1 is inserted into the mounting housing up to its contact surface 10 on the cover side—arranged parallel to the contact surface 9 on the end face on the side of the air filter 1 facing the observer according to FIG. 1—, so that the closure cover can be closed by the installer behind the air filter 1, whilst the air filter 1, which is largely rigid in compression in the longitudinal direction L, receives the compressive force exerted by the closing of the cover.

Figure 2:
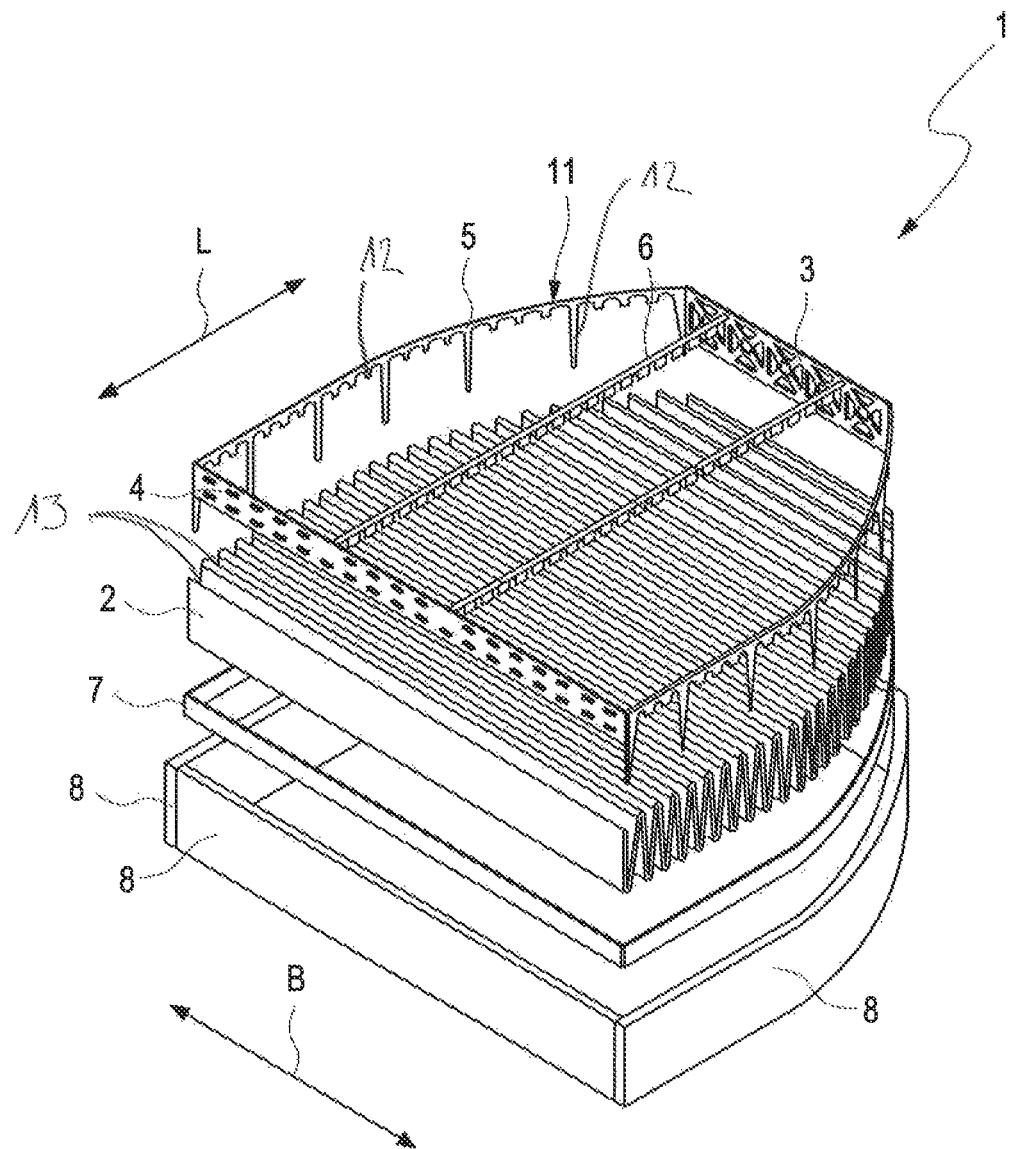

The exploded illustration of FIG. 2 illustrates precisely how this compressive rigidity of the air filter 1 in its longitudinal direction L corresponding to the mounting direction M is to be realized according to the lightweight construction in accordance with the invention. The bellows 2, folded in the longitudinal direction L, can now be seen, the fold edges of which are therefore oriented in the transverse direction B running transversely to the longitudinal direction L. Particular attention is accorded here to the skeleton-like comb-like ring 11, which runs substantially completely around the bellows 2 and fixes its folds 13 in their designated position by means of a plurality of supporting teeth 12.

A belt band 7, likewise running around the bellows 2, which in turn is enclosed by a sealing band 8 impermeable to air, additionally secures the assembly which is shown. It shall be understood that an alternative embodiment of an air filter 1, not shown in the illustrations, at the cost of the additional securing in place or respectively sealing, may dispense with the use of the belt band 7, the sealing band 8, or even both bands 7, 8, without departing from the scope of the invention.

Figure 3:
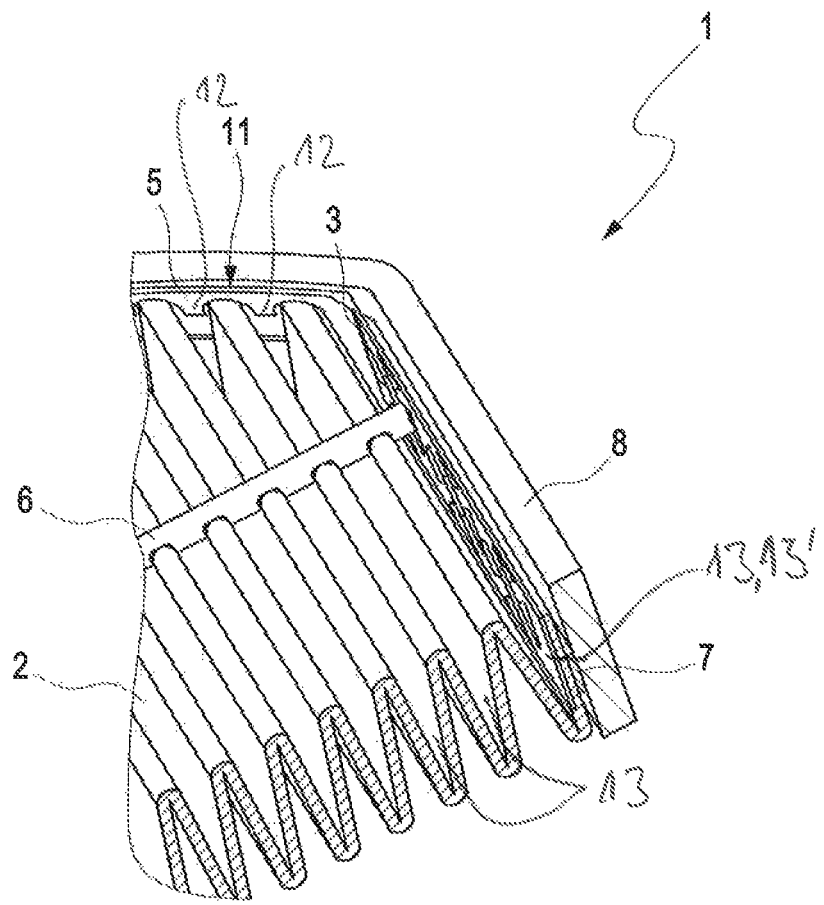

FIG. 3 shows the enlarged edge of the air filter 1 in the region of its fold blade 3 on the end face, which fold blade, for the mechanical reinforcing of an end fold 13' is inserted into same. In accordance with the perspective view of FIG. 1, the air filter 1 is now again illustrated in its final state, ready for installation, wherein, however, the circumferential sealing band is indicated only as partially transparent for reasons of clarity. The specific height of the fold blade 3 on the end side now becomes clear, which falls only just short of that of the bellows 2 itself, in order to permit a sufficient introducing into its end fold 13' and to give the comb-like ring the desired compressive rigidity in longitudinal direction L. The characteristic openings of the fold blade 3 on the end side, which according to the pattern of a lattice leave the supporting structure of the supporting frame untouched, lead here to a considerable reduction in material and weight and allow the fold blade 3, at the same time, a certain flexibility and adaptability to unevennesses of the receiving housing.

The enlarged partial illustration of FIG. 3 shows, in addition, a supporting strut 6, perpendicular to the fold blade 3 on the end side, connected therewith, the low supporting teeth 12 of which alternate with narrow cutouts for securely clamping the filter medium, and support the fold blade 3 on the end face therefore in the receiving of the compressive forces occurring in longitudinal direction L.

Figure 4:
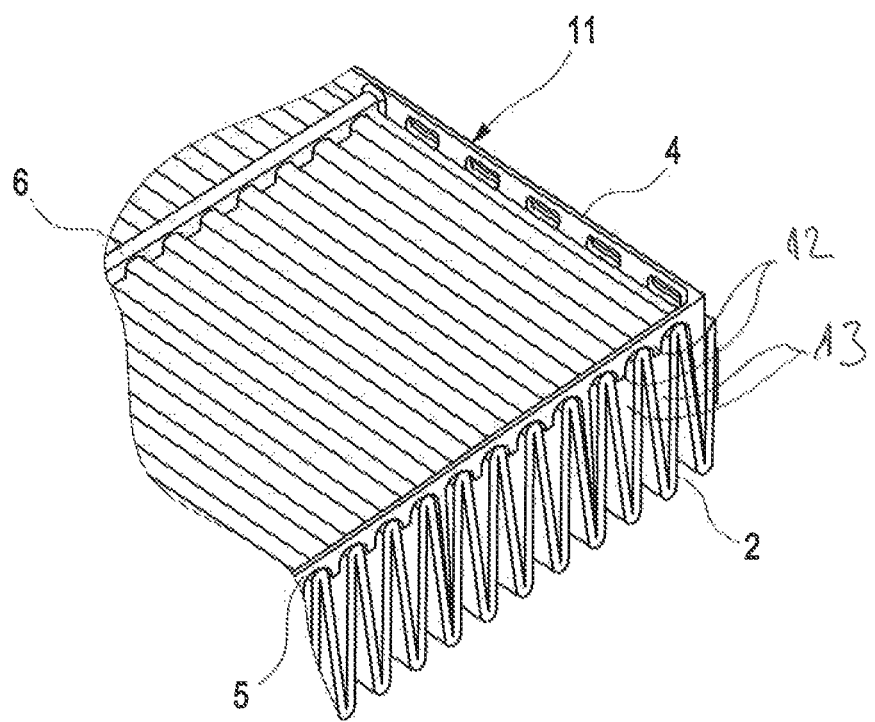

As can be seen from FIG. 4, this supporting strut 6 connects the fold blade 3 on the end face of FIG. 3 with a fold blade 4, running in parallel, on the cover side, the channel-shaped depression of which, running along the blade 4—according to the operating principle of a reinforcement corrugation—increases the rigidity of the supporting frame in an advantageous manner.

The shape of the outer band 5 can also be seen from the enlarged partial view according to FIG. 4. In this respect, an alternating sequence of respectively three low supporting teeth 12 with one high supporting tooth 12 becomes clear, wherein each supporting tooth 12 keeps two adjacent folds 13 at a predefined distance. A concave cutout of the outer band 5, formed between two adjacent supporting teeth 12, which cutout is larger compared with the mentioned cutouts of the supporting strut, serves here to receive each fold 13, in order to enable a lateral displacement of the folds 13 in certain limits. A plurality of joining points, not able to be seen in FIG. 4, provided between the outer band 5 and the folds 13, connects the folds 13 nevertheless in a punctiform manner with the outer band 5 and thus serves for its securing in position.

Figure 5:
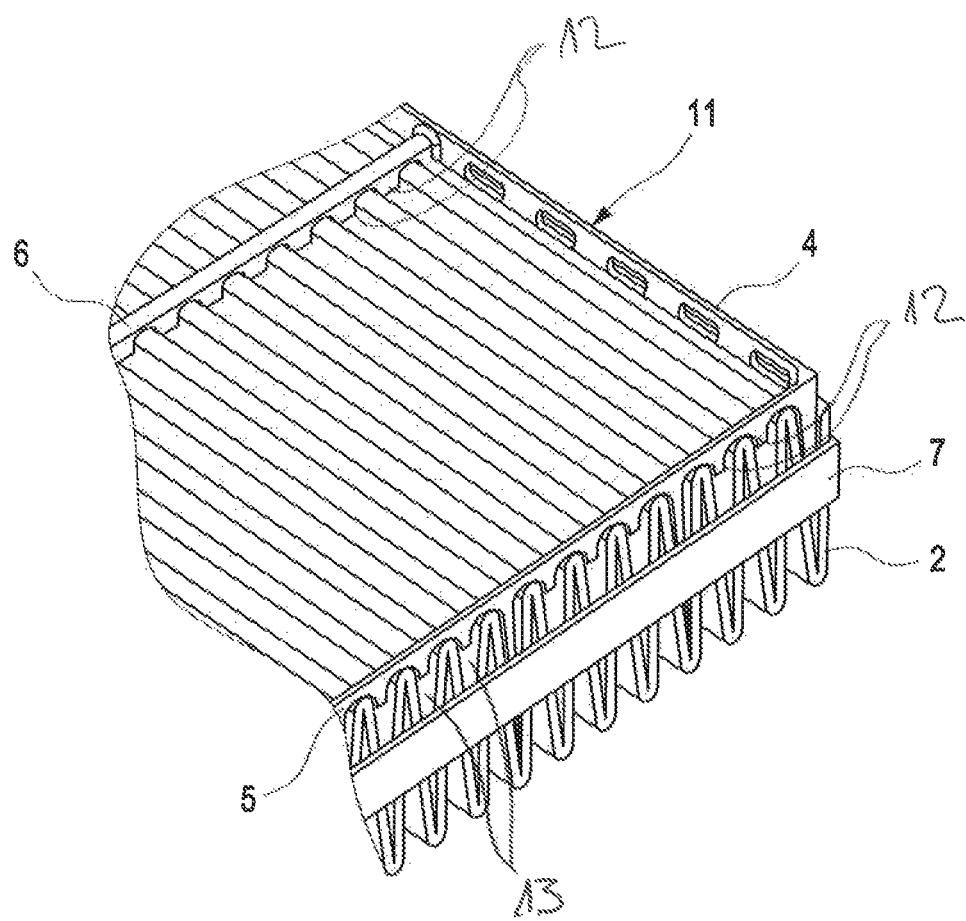

The securing function of the comb-like ring 11 is additionally supported by the circumferential belt band 7 illustrated in FIG. 5, the width of which noticeably falls short of the fold height for the benefit of the reduction in weight. This additional reinforcement permits a particularly thin-walled embodiment of the comb-like ring 11 for example in injection moulding technique, wherein a wall thickness of less than 1.0 mm, but at least in the range below 1.5 mm proves to be sufficient, depending on application. The small wall thickness which is aimed for can require the liquefied, generally polymeric material to be injected at several positions into a corresponding injection moulding tool, in order to ensure its uniform distribution within the mould. Alternative embodiments may use as material, for example, a cardboard or a suitable pressed material, without departing from the scope of the invention.

The invention claimed is:

1. An air filter comprising:
    a bellows made of an air-permeable filter medium, which is folded in a longitudinal direction to form a plurality of folds, for filtering air, and
    a supporting frame for supporting the bellows,
    wherein the supporting frame is a substantially closed comb-like ring having a plurality of supporting teeth, at least two supporting teeth adjacent in the longitudinal direction fixing at least two folds of the bellows adjacent in the longitudinal direction a predefined distance from each other, and
    wherein the comb-like ring includes two fold blades and two outer bands connecting the fold blades, the two fold blades being inserted in a transverse direction running transversely to the longitudinal direction into respective end folds of the bellows, and the two outer bands having the supporting teeth, including high supporting teeth and low supporting teeth, where the high supporting teeth are taller than the low supporting teeth.

2. The air filter according to claim 1, further comprising a plurality of joining points between the outer bands and the folds, wherein the outer bands are connected at the joining points with the folds.

3. The air filter according to claim 1, further comprising at least one supporting strut, aligned in the longitudinal direction, connecting the fold blades, the supporting strut having further supporting teeth.

4. The air filter according to claim 1, further comprising a belt band, surrounding the bellows, with a width that is less than a fold height of the bellows.

5. The air filter according to claim 4 further comprising a sealing band of a sealing medium impermeable to air, running around the belt band, for sealing the air filter.

6. The air filter according to claim 5, wherein the sealing band has a contact surface on an end face and a contact surface on a cover side, so that, when the air filter is mounted, according to a mounting direction corresponding to longitudinal direction, in a housing with an end plate and a closure cover, the contact surface on the end face lies against the end plate and the contact surface on the cover side lies against the closure cover.

7. The air filter according to claim 1, wherein the comb-like ring has a wall thickness of less than 1.5 mm.

8. The air filter according to claim 1, wherein the comb-like ring contains a thermoplast, a cardboard, or a pressed material.

9. The air filter according to claim 2, wherein the outer bands are connected at the joining points in a firmly bonded manner with the folds.

10. The air filter according to claim 2, wherein the outer bands are welded or bonded to the folds by means of a hot melt.

11. The air filter according to claim 2, further comprising at least one supporting strut, aligned in the longitudinal direction, connecting the fold blades the supporting strut having further supporting teeth.

12. An air filter comprising:
    a bellows made of an air-permeable filter medium, which is folded in a longitudinal direction to form a plurality of folds, for filtering air,
    a supporting frame for supporting the bellows, the supporting frame including a comb-like ring having two fold blades and two outer bands connecting the fold blades, the two fold blades being inserted in a transverse direction running transversely to the longitudinal direction into respective end folds of the bellows, the two outer bands having a plurality of supporting teeth, at least two supporting teeth adjacent in the longitudinal direction fixing at least two folds of the bellows adjacent in the longitudinal direction at a predefined distance from each other,
    at least one supporting strut, aligned in the longitudinal direction, connecting the fold blades, the supporting strut having additional supporting teeth,
    a belt band surrounding the bellows, the belt band having a width that is less than a fold height of the bellows, and
    a sealing band of a sealing medium impermeable to air, running around the belt band, for sealing the air filter.

13. The air filter according to claim 12, wherein the comb-like ring is substantially closed.

14. The air filter according to claim 12, wherein the supporting teeth include high supporting teeth and low supporting teeth.

15. The air filter according to claim 12, further comprising a plurality of joining points between the outer bands and the folds, wherein the outer bands are connected at the joining points with the folds.

16. The air filter according to claim 15, wherein the outer bands are connected at the joining points in a firmly bonded manner with the folds.

17. The air filter according to claim 15, wherein the outer bands are welded or bonded to the folds by means of a hot melt.

18. The air filter according to claim 12, wherein the sealing band has a contact surface on an end face and a contact surface on a cover side, so that, when the air filter is mounted, according to a mounting direction corresponding to longitudinal direction, in a housing with an end plate and a closure cover, the contact surface on the end face lies against the end plate and the contact surface on the cover side lies against the closure cover.

19. The air filter according to claim 12, wherein the comb-like ring has a wall thickness of less than 1.5 mm.

20. The air filter according to claim 12, wherein the comb-like ring contains a thermoplast, a cardboard, or a pressed material.

* * * * *